United States Patent
Sweat et al.

(10) Patent No.: US 6,676,914 B1
(45) Date of Patent: Jan. 13, 2004

(54) PHOSPHATE ACIDULATION UTILIZING HF ACID

(75) Inventors: Samuel Franklin Sweat, Plant City, FL (US); Claude E. Breed, Florence, AL (US); Kenneth E. McGill, Muscle Shoals, AL (US)

(73) Assignee: HF Extraction, LLC, Muscle Shoals, AL (US)

( * ) Notice: Subject to any disclaimer, the term of this patent is extended or adjusted under 35 U.S.C. 154(b) by 284 days.

(21) Appl. No.: 09/591,341

(22) Filed: Jun. 9, 2000

(51) Int. Cl.$^7$ ............................ C01B 25/22; C01F 11/22
(52) U.S. Cl. ................. 423/319; 423/157.3; 423/490
(58) Field of Search ............................. 423/157.3, 319, 423/490

(56) References Cited

U.S. PATENT DOCUMENTS

| | | |
|---|---|---|
| 1,018,746 A | 2/1912 | Dittmar |
| 1,313,379 A | 8/1919 | Hechen-Bleikner |
| 2,493,915 A | 1/1950 | Cross et al. ................. 23/165 |
| 3,323,864 A | 6/1967 | Lapple ........................ 23/165 |
| 3,684,435 A * | 8/1972 | Lepomaa et al. ......... 423/157.3 |
| 3,792,153 A | 2/1974 | Lynn et al. ................. 423/319 |
| 4,557,915 A * | 12/1985 | Nineuil ..................... 423/157.3 |
| 6,224,844 B1 * | 5/2001 | Vernooy et al. ............ 423/490 |

FOREIGN PATENT DOCUMENTS

| | | |
|---|---|---|
| BE | 750 498 | 10/1970 |
| RU | 880 974 | 11/1981 |

OTHER PUBLICATIONS

Hackh's *Chemical Dictionary*, Fourth Edition, McGraw–Hill Book Company (1969), p. 553. (no month).*

* cited by examiner

*Primary Examiner*—Wayne A. Langel
(74) *Attorney, Agent, or Firm*—Jacobson Holman PLLC

(57) ABSTRACT

Phosphoric acid, essentially free from impurities, is prepared by reacting aqueous hydrofluoric acid with phosphate in particles of calcium bearing phosphate rock to form a calcium fluoride pseudomorph solid from which filter-grade phosphoric acid is separated. By reacting the pseudomorph solid with sulfuric acid and thermally treating the reaction product, the HF can be liberated and recycled back to the reaction step of the process. All of the impurities from the phosphate rock are contained in the resulting $CaSO_4$.

15 Claims, No Drawings

PHOSPHATE ACIDULATION UTILIZING HF ACID

BACKGROUND

According to Dittmar (U.S. Pat. No. 1,018,746) phosphoric acid is obtained in a high degree of purity by mixing a phosphate of an alkali metal or of an alkaline earth metal with hydrochloric acid or hydrofluoric acid in excess "as the chlorid or the fluorid of the metal is insoluble in hydrochloric acid or hydrofluoric acid respectively, whereupon the metal is precipitated as an insoluble chlorid or fluorid, the phosphoric acid being liberated and remaining in solution so that it can be separated by filtration." In the case of phosphates or superphosphates of alkaline earths, for example calcium or magnesium phosphate, excess of hydrofluoric acid is used.

Hechenbleikner (U.S. Pat. No. 1,313,379) treats phosphate rock with a mixture of dilute hydrofluosilicic and hydrofluoric acids.

Cross (U.S. Pat. No. 2,493,915) treats phosphate rock with a minimum amount of moisture present with sulfuric acid, hydrogen chloride or even hydrogen fluoride or any other strong acid to form phosphoric acid together with the calcium salt of the acid used in treatment. This phosphoric acid is then extracted with sulfuric ether, amyl alcohol or other volatile solvent. Any organic solvent which will dissolve the phosphoric acid but will not dissolve the calcium salt may be used. Accordingly, his claims are directed to reacting calcium phosphate material in a tower by introducing into the tower and passing upwardly through the calcium phosphate material therein a gaseous reagent selected from the group consisting of hydrogen chloride and hydrogen fluoride.

Lapple (U.S. Pat. No. 3,323,864) points out that a "hydrofluoric acid-based process is generally impractical for commercial operation because the rate of rock attack with an acid of practical strength is too slow and because of the high cost of this acid."

Lynn (U.S. Pat. No. 3,792,153) notes, with regard to the digestion of phosphate rock to form phosphoric acid, that current "processes digest the mineral with sulfuric acid during which process HF may be liberated, creating a severe pollution problem for the phosphate industry. By-product gypsum is formed in quantities much too large for the available market, and the digestion is relatively slow because of the formation of the insoluble gypsum."

Russian Patent No. 880,974 refers to decomposition of phosphate rock with perchloric and hydrofluoric acid and then with nitric acid.

Claim 2 of Belgian Patent No. 750,498 relates to heating a mixture of calcium phosphate mineral with a water-soluble fluoride and acid, wherein the acid can be, inter alia, hydrofluoric acid.

SUMMARY OF THE INVENTION

Aqueous hydrofluoric acid is mixed with phosphate rock in a relatively small reactor or in one or more small vessels for a retention time of at least 10 seconds, usually between 10 and 30 minutes. After complete reaction, a slurry of calcium fluoride ($CaF_2$), phosphoric acid and some excess HF is separated, using normal separation techniques, such as a basic table filter. The first wash from the filter, containing from 10 to 15% $P_2O_5$ and 2 to 10% HF, is recycled back to the reaction section to regulate the amount of solids in the slurry to the filter and to recover the $P_2O_5$ that is washed from the filter cake. The return stream, which contains some dissolved $Ca^{++}$ ions, must be added to the reactor slurry after the reaction between the phosphate and the HF has taken place to prevent the formation of very small crystals of $CaF_2$.

Filter grade acid of from 10 to 33% (usually from about 25 to 28%) $P_2O_5$ is concentrated from 40% to >60% $P_2O_5$ in a standard vacuum evaporator. The product concentration step is similar to that used in conventional wet-process phosphoric acid production. However, in the subject process essentially no solids are precipitated during this step, thus reducing a major waste material-handling problem that is currently faced by the industry.

Clarification techniques and/or activated carbon absorption may be used to produce a clear-product acid for use as technical or food-grade acid.

The $CaF_2$ filter cake (is in the form of pseudomorphs having greater than 95% $CaF_2$) recovered from the filter is mixed with sulfuric acid and thermally treated in a rotary kiln in which HF fumes are liberated from the solids. The fumes generated during this acidification/thermal treatment are scrubbed from the exit gas stream using standard absorber technology. A by-product of the rotary (regeneration) kiln is calcium sulfate which is stacked in contained piles. The $CaF_2/H_2SO_4$ reaction, thermal treatment, and HF recovery steps of the process rely on proven existing technology and process equipment commonly used in the HF production industry.

The scrubbed/recovered HF, less than 50% and normally less than 37% HF, is subsequently concentrated in an HF concentrator and recycled to the reactor; excess HF is marketed. Gas vented from the HF concentrator is returned to the HF recovery system.

Scrubbing HF vapors from the reactor, from the filter and from the $H_3PO_4$ concentrators serves to both control and recover the HF emissions from these pieces of apparatus. Recovery of the HF and return to the reaction system are advantageous from both an environmental and economic point of view. Clean vapors from the HF process scrubber(s) and from the HF recovery absorber(s) are vented to the atmosphere.

An advantage of this invention is that it requires significantly fewer pieces of process equipment that are generally smaller in size than the equipment used in the conventional phosphoric acid-producing methods. A further advantage is a reduction in reactor retention time from the 6 to 12 hours necessary to effect good rock dissolution and to grow desired-size gypsum dihydrate ($CaSO_4.2H_2O$) crystals (essential for good filtration and high $P_2O_5$ recovery) to only about 10 minutes to effect good conversion of the phosphate rock to $CaF_2$. [Crystals of $CaF_2$ take the form of the phosphate rock (pseudomorphs) in the feed, and dissolution and recrystallization are not required.]

A still further advantage is the reduction in agitation requirements for reaction; the conventional process requires agitation to effect complete dissolution of phosphate rock. The degree of agitation is extremely high and results in high-energy usage and in erosion of the equipment located inside the reactor. The agitator drives generally require up to or greater than 100 HP for each compartment (up to 13); the subject process requires only one low energy agitator per reaction vessel which operates at a more gentle level of agitation, just enough to keep the solid particles suspended without causing particle attrition. (If a pipe reactor is used, no agitation is required.)

Another advantage is in the required management of heat, which is essential to the proper operation of the conventional process, in which heat is normally removed using a large flash cooler that operates at about 4 inches of Hg absolute pressure. The vacuum is generated by the use of a steam ejector followed by a barometric condenser or by a vacuum pump. The subject process requires a substantially lower level of removal of the heat of reaction. This is the result of the formation of pseudomorphs rather than the growing of gypsum crystals. It is anticipated that no heat removal will be required.

An additional advantage is in process control and automation. In the conventional process, the free sulfate level in the reactor is probably the most important process variable and is also one of the most difficult to measure and control on a steady/predictable basis. The automation of the measurement and/or control of the free sulfate level has been attempted many times over the years, but the problem has remained essentially unsolved. In addition, when an adjustment is made to the system, it takes several hours to see the final results. This is due in part to the long retention time in the reaction section and to slow changes that occur with the growth of $CaSO_4$ crystals. Total automation of the conventional system is very difficult. As the major process controls for the subject invention are based primarily on chemical analysis and feed rates of the raw material inputs to the reactor, both process control and automation are easily handled. Instead of a free sulfate measurement, a free HF level is monitored. The free HF level is not nearly as critical as is the free sulfate level. The major emphasis is to maintain a sufficiently high free HF level in the reactor loop so that all of the rock can be converted to the $CaF_2$ pseudomorphs. There is a quick response time to process changes because of the short retention times required and because there is no crystal growth rate to consider.

A further advantage involves the filtration/separation area. In the conventional process a problem arises with scaling inside the main valve, pans and drain lines. Solids (mainly calcium sulfate.$xH_2O$) precipitate out of the supersaturated acid during filtration and form hard scale deposits, which have to be removed physically, such as manually chipping them out, and this results in unplanned operating down time. The-solids build-up also results in excess wear on rotating surfaces and/or surfaces of the filter. The instantly-claimed process utilizes the same basic primary filter (table, tilting pan, or belt). However, the acid is not supersaturated with $CaF_2$, and scaling of the filter does not occur.

The on-stream time for the filter (and plant as a whole) is thus longer.

A still further advantage involves storage at all acid concentrations. Management of solids that accumulate in phosphoric acid after it is filtered is currently a major problem within the industry. This problem occurs throughout the time the acid is filtered, stored, concentrated, shipped, and used. A high level of dissolved solids in merchant grade acid (a common occurrence) makes it very difficult for an end user (such as a fluid fertilizer dealer) to use the product. This means that the dealer will generally have to use a more expensive superphosphoric acid for clear liquids or use a solid monoammonium phosphate (MAP) (contains solids from the acid) to produce a suspension-based fertilizer. Bulk shipments of merchant grade acid post precipitates vast amounts of solids creating high $P_2O_5$ losses and clean-up problems. The acid produced by the HF process does not create these problems.

Filter-grade acid (about 26 to 29% $P_2O_5$) from conventional processes is supersaturated with gypsum. After the acid is separated using a filter, normal practice lets the acid sit in a storage tank where fine gypsum crystals precipitate. This results in a sludge material that is comprised of very small crystals, and which is generally recycled from the bottom of the tank(s) back to the primary filter and/or reactor system. This in turn tends to reduce the overall filtration rate.

The filter-grade acid that has settled is then fed to an evaporation system where it is concentrated to a merchant-grade acid (about 54% $P_2O_5$). This is typically done in two steps; the first step goes to about 40% $P_2O_5$, and the second, to the final 54% level. Solids precipitation is a major problem in both of these steps.

In the instantly-claimed process there is very little or no solids accumulation. The reaction depends upon an in-situ reaction where the $CaF_2$ is formed as a pseudomorph having the same shape and size as that of the phosphate rock feed. Essentially no dissolution and/or re-precipitation takes place. In addition, impurities contained in the phosphate rock do not dissolve into the acid, but remain inside the pseudomorphs, and this results in a very clean acid, having low dissolved solids and low impurities.

One of the major advantages of the instantly-claimed process is its ability to produce a clean acid, one clean enough to be easily made into an 18-46-0 grade diammonium phosphate (DAP) without adding urea or ammonium nitrate. Also, merchant-grade acid from the instant process can be readily shipped in rail cars and stored at dealer sites without solids accumulation. This makes it possible for fluid fertilizer dealers to use a less expensive raw material than they are currently using. The presently-disclosed process also makes it possible for major phosphate fertilizer companies that manufacture superphosphoric acid (SPA, ~70% $P_2O_5$) to produce their product easier than is possible using the conventional sulfate-based process because of the lack of solids precipitation and lower acid viscosity. This allows the production of an alternative product with lower $P_2O_5$ values with the same benefits as SPA.

Another advantage involves concentration/evaporation. The concentration of acid from the filter is necessary to yield a product that can be further used to ship or to produce a variety of products (including solid and liquid fertilizers). The concentration step is carried out in steam-heated vacuum evaporators. In the conventional process the filter-grade acid is generally between 26 and 29% $P_2O_5$. The evaporation step is fairly straight-forward with the filter-grade acid being concentrated in two steps. The first step is from 26% to 40% $P_2O_5$. The obtained product is stored before it is concentrated to 54% $P_2O_5$. The storage at 40% is for two purposes: the first is to let some of the solids settle, and the second is that 40% $P_2O_5$ is a strength traditionally used to produce DAP.

Prior to, during, and following the concentration step, there are major problems with solids and impurities. These solids tend to fill the storage tanks and scale the processing equipment; dissolved impurities result in a higher -boiling point for the acid (higher steam requirement). The solids also cause some erosion in the circulation and heating systems of the evaporators, restriction of flow in the heat exchangers, and reduced heat transfer in the heat exchangers.

The instantly-claimed process produces filter-grade, intermediate-grade, or merchant-grade acids with very few solids present. This is because there is essentially no $CaF_2$ dissolved in the acid, and essentially all of the metal impurities are trapped inside the $CaF_2$ filter cake. Therefore, there are no scaling, plugging, or erosion problems associated with the process.

As the filter-grade acid from the subject process is purer than that produced by conventional methods, the resulting boiling point is lower. This makes it easier to concentrate material and results in significant savings in the amount of steam used for heating. The improved flow through the heat exchangers and lower scaling result in higher heat transfer which results in higher steam efficiencies.

A major advantage of the instantly-disclosed process is its ability to use a wide variety of phosphate rock supplies. In addition, the HF can be recycled using proven technology and this eliminates the need for an outside source of HF (an important economic advantage for the process).

Generally speaking, the best grade of phosphate rock in the United States has been consumed steadily over the last century. Remaining deposits show increased levels of impurities, such as magnesium, iron, and aluminum. These higher levels of impurities make the production of phosphoric acid and the phosphate-based fertilizers more difficult and more expensive. Some current mining areas in Florida are being skipped and/or covered over and lost because of high magnesium levels in the phosphate rock. There are numerous marginal-grade rock deposits in developing countries that are currently considered too small and too expensive to develop and/or process. The presently-disclosed process will allow economical use of such rocks. This, in turn, will be a major boost to the agricultural economy and development of these countries.

The presently-claimed primary process can use almost any phosphate rock source while immobilizing impurities inside individual filter-cake particles. This is done by the formation of pseudomorphs, which tend to let the HF penetrate into the rock particle and then let the pure phosphoric acid exit out of the particle. The outer ring of $CaF_2$ on the pseudomorph appears to act like a microfilter, and the impurities remain trapped inside the particle as metal fluorides. In the conventional sulfuric acid based processes, the phosphate rock is totally dissolved, and the impurities are free to react and to go into solution and/or to precipitate.

The instantly-disclosed process significantly increases the overall usable phosphate reserves for the United States and for the world. The combination of smaller processing equipment/overall facility size and the ability of the subject process to use impure rock deposits found in developing countries will potentially allow these countries to become more self-sufficient in agriculture.

Although there are many further advantages, the principal advantages are:
1) The majority of involved metallic materials (iron, aluminum, magnesium, etc.) stay with the $CaF_2$, yielding a significantly cleaner product phosphoric acid, making direct production of technical and/or food-grade acid possible.
2) The cleaner acid obtained makes it possible for the fertilizer industry to achieve and maintain an 18-46-0 fertilizer grade for diammonium phosphate (DAP) without addition of urea or ammonium nitrate. The absence of heavy metals, such as cadmium and lead, in the product will significantly increase the international market potential for some of the DAP currently produced in the U.S.
3) The clean acid is also useful for producing a premium fluid fertilizer with or without polyphosphates.
4) The world's supply of available/usable phosphate rock is expanded significantly because the process makes it economical to produce phosphoric acid from rock having higher levels of impurities.
5) The filter cake by-product from the process is primarily calcium fluoride, which can be converted to $CaSO_4$, using proven existing technology. This in turn releases HF which is recycled to the reaction section of the process; excess HF can be sold as a marketable commodity. If the $CaF_2$ produced is not converted, it can be sold as a marketable raw material for the HF production industry.
6) Little or no process cooling is required for the process, thus significantly reducing the size and concentration of fluorine laden cooling ponds. A calcium hydroxide final scrubber will essentially remove/recover all fluorine air emissions and the solids from the scrubber.
7) $CaF_2$ would be regenerated to $CaSO_4$ and HF for further reaction or for sales rather than being placed in cooling ponds.
8) The subject process has significantly lower retention times in the reaction section. Smaller and simpler process equipment is thus required.
9) Energy usage is significantly reduced due to lower agitation and pumping requirements, as well as lower heat requirements during evaporation.

DETAILS

High purity, high quality phosphoric acid is produced in a continuous process from phosphate ore by reacting HF in aqueous hydrofluoric acid with particles of calcium-bearing phosphate rock, and separating filter-grade phosphoric acid and a calcium fluoride pseudomorph from a thus-produced aqueous slurry.

The filter-grade phosphoric acid is essentially free from troublesome impurities, including such elements as aluminum, magnesium, iron salts and various other heavy metals (chromium, vanadium, lead, arsenic, uranium, cadmium, etc.) normally associated with starting phosphate rock. The produced phosphoric acid has many uses, either as fertilizer-grade phosphoric acid, technical-grade phosphoric acid, or food-grade phosphoric acid, each of which has excellent storage and transportation properties, as no solids settle out of the obtained products.

The employed calcium-bearing phosphate rock normally contains from about 10 to about 43% (preferably from about 20 to about 40%, and most advantageously from about 30 to about 35%) $P_2O_5$. Particles of the treated phosphate rock are normally in an initial size in the range of from about 5 or about 10 microns to about 1 centimeter.

Aqueous hydrofluoric acid having a concentration of between about 10 and about 70 (preferably from about 20 to about 37, and more advantageously from about 25 to about 35) weight % HF is reacted with phosphate in the particles of phosphate rock in approximately stoichoimetric amounts ranging from about 90 to about 150% (preferably from 100 to 130% and more advantageously from 105 to 110%) of the theoretical amounts to satisfy the fluorine to phosphorus mole ratio.

Reaction is effected at a temperature in the range from ambient to boiling (preferably from 140° to 210° F., and more advantageously from 180° to 200° F.) and for a period of time ranging from about 10 seconds (preferably for a period of from about 1 to about 30 minutes, and more advantageously for a period of from about 10 to about 20 minutes). The reaction time may vary because of the particle size of the starting phosphate rock, chemical composition of the rock, presence of phosphatic material other than phosphate rock, such as bone meal, and even non-calcium-phosphates, such as titanium phosphate.

The reaction between hydrofluoric acid and the phosphate yields an aqueous slurry containing a liquid component, filter-grade phosphoric acid, and a solid component which is a pseudomorph comprised primarily of calcium fluoride ($CaF_2$), and which is essentially of the same form (size and shape) as the phosphate feed material. This $CaF_2$ solid is formed rather than the undesirable phosphogypsum which is formed in the conventional process using sulfuric acid as the acidulation agent. Since essentially no dissolution occurs in the present process with hydrofluoric acid, neither flash cooling nor the necessity for crystal growth (linked with the conventional process using sulfuric acid) is warranted.

The reaction requires a short retention time, can be accomplished in a minimum of reaction vessels, and requires a minimum of physical agitation and pumping. During the reaction step, it is essential that there is a minimum of free $Ca^{++}$ ions are introduced (such as with recycled #1 filter wash acid) into the reactor prior to the contact and reaction of the rock with HF.

The calcium fluoride pseudomorphs are separated from the obtained filter-grade phosphoric acid by standard separation techniques, e.g., filtration or centrifugation. The actual choice of separation may vary with the phosphate feed source.

The calcium fluoride pseudomorph is reacted, e.g., in a regeneration kiln with sulfuric acid and is converted to $CaSO_4$ which can be stacked in an environmentally acceptable manner. The HF vapor released from the kiln is scrubbed for recycling to the process or for sale.

Virtually all of the calcium from the calcium-bearing phosphate rock is retained in the calcium fluoride cake (pseudomorph), rather than in the resulting phosphoric acid product or in any concentrated phosphoric acid produced from the filter-grade phosphoric acid product. Also, essentially all impurities, such as iron, magnesium, aluminum, silica (primarily Crystobalite), etc., in the calcium-bearing phosphate rock starting material are retained in the calcium fluoride pseudomorph. Likewise, essentially all toxic metals, such as cadmium, lead, and radioactive uranium, are retained in the calcium fluoride cake, thus enhancing the environmental impact statement of the final phosphate products and allowing safer and more environmentally-sound principals to be applied to the recovery of these toxic metals.

The calcium fluoride pseudomorph solid plays a significant role in capturing and retaining impurities that otherwise would contaminate produced phosphoric acid.

The filter-grade phosphoric acid generally has from about 10 to about 33 (preferably from about 15 to about 32, and more advantageously from about 25 to 30) % $P_2O_5$. Essentially all recoverable phosphate in the calcium-bearing phosphate rock starting material is recovered as $P_2O_5$ in the filter-grade acid, rather than being left in $CaF_2$ filter cake. The filter-grade phosphoric acid is readily concentrated to higher $P_2O_5$ levels easier than filter-grade phosphoric acid made by state of the art processes (i.e., acidulation of phosphoric rock by sulfuric acid) because the subject process produces phosphoric acid without dissolved impurities, which cause difficulties in normal concentration procedures.

High purity phosphoric acid, as mentioned throughout this disclosure, means that essentially all undesirable metal impurities present in the phosphate rock used to make phosphoric acid are not present in the phosphoric acid (at any concentration) made by the subject process. Using prior technology to produce fertilizer grade phosphoric acid, these impurities are in the phosphate rock from the mine and are transferred to the phosphoric acid during its production. Special processing, which is expensive, is normally used to make technical grade and food grade phosphoric acid. Both technical grade and food grade are essentially without these impurities and can be directly produced by the subject process. As stated earlier, these impurities are iron (sometimes ferrous and ferric), magnesium, aluminum, calcium, cadmium and nonmetals, such as fluorine. There are many other impurities, some of which do not cause troublesome precipitates when used to make liquid fertilizers. A small amount of these impurities cause no harm in making most granular fertilizers. There are many that lower the availability of the phosphate in diammonium phosphate, a commodity.

Purity refers to chemical purity.

High quality phosphoric acid, as mentioned throughout this disclosure, refers to physical quality and, to some extent, to chemical quality because of the lack of impurities. Acid made by the subject process can be concentrated to higher $P_2O_5$ concentrations than that made by the generic wet-process method because of less impurities in the acid. Normally phosphoric acid made from phosphate rock (from Western, North Carolina, and Florida rocks) can only be concentrated up to about 57% $P_2O_5$, whereas the subject process phosphoric acid (made from phosphate rocks containing at least 24% $P_2O_5$) can be concentrated to 60% or greater $P_2O_5$. The acid made by the subject process can be made into fertilizer grade, technical grade or food grade without special processing, and can be transported without solids settling (precipitated compounds formed from the impurities) because there are no impurities present to form such solids. (Special processing is any process other than the wet-process which uses sulfuric acid to digest the phosphate rock.)

Excellent transportation properties, as mentioned throughout the disclosure, refer to a clean impurity-free phosphoric acid that can be transported in bulk via railcar, tank truck, or ocean tanker without having compounds (formed by impurities) settle to the bottom of the vessel. As much as 50% by volume of a vessel containing phosphoric acid has been known to be in the form of settled solids. Currently, about 20% by volume of settled solids is seen on phosphoric acids that are shipped or transported.

Calcium fluoride pseudomorph is a solid (calcium fluoride compound) that is formed when HF reacts with phosphate rock or other phosphate source. The phosphate is extracted from the phosphate rock leaving everything in place except the phosphate. The shape of the solid is not changed, it is that of the phosphate. This is evidenced by the fact that there is no dissolution of the calcium during the reaction with HF. A pseudomorph is a mineral having the crystalline form of another mineral rather than the normal characteristics of its own. Impurities in the phosphate rock are retained in the original rock shaped particles via the pseudomorph formation.

Throughout the disclosure, wherever the term "about" is used, a variation of ±5% is contemplated. In this disclosure, the term phosphate rock is used to describe any type of mineral phosphate that may be used as a feed stock to the process. The list of minerals includes but is not limited to materials, such as a carbonate, fluorapatite, hydroxyapatite, and apatite. In the trade, apatite normally refers to a nonporous, dense, macrocrystalline fluorapatite of igneous origins, whereas phosphate rock is generally a porous, low-density, microcrystalline, calcium fluorphosphate of sedimentary origin. An alternate name for phosphate rock, especially in foreign countries and in older U.S. references, is phosphorite.

The invention and its advantages are readily apparent from the foregoing description. Various changes may be made in the process without departing from the spirit and scope of the invention or sacrificing its material advantages. The hereinbefore described process is merely illustrative of preferred embodiments of the invention.

What is claimed is:

1. A process for producing storage stable, transportation stable, high purity, high quality phosphoric acid essentially free from impurities, which comprises the following steps:
   a) reacting aqueous hydrofluoric acid with phosphate in particles of calcium-bearing phosphate rock for a period of at least ten seconds and at a temperature of from ambient temperature to boiling to obtain a slurry containing filter-grade phosphoric acid and a solid component which is a pseudomorph comprised primarily of calcium fluoride, and
   b) separating the filter-grade phosphoric acid from the pseudomorph.

2. A process of claim 1 wherein the amount of fluorine in the hydrofluoric acid is from about 0.9 to about 1.5 times the fluorine to phosphorus mole ratio based on the amount of phosphorus in the phosphate present in step (a).

3. A process of claim 1 wherein the particles of phosphate rock have an initial size in the range of from about 5 microns to about 1 centimeter.

4. A process of claim 1 wherein the phosphate rock contains from about 10 to about 43 percent by weight of $P_2O_5$.

5. A process of claim 1 which further comprises reacting calcium fluoride from the pseudomorph with sulfuric acid to form $CaSO_4$ and release HF for recycle and/or sale.

6. A process of claim 1 which further comprises concentrating the filter-grade phosphoric acid to obtain a high quality, high grade phosphoric acid containing up to 60 weight percent $P_2O_5$.

7. A process of claim 1 which further comprises recycling HF obtained from the pseudomorph to step (a).

8. A process of claim 1 wherein step (a) consists essentially of reacting aqueous hydrofluoric acid with phosphate in the particles of calcium-bearing phosphate rock.

9. A process of claim 1 wherein the period is within the range of from about 1 to about 30 minutes.

10. A process of claim 9 wherein the period is within the range of from about 10 to about 20 minutes.

11. A process of claim 1 wherein step (a) is conducted only for a period sufficient to extract phosphate from the calcium-bearing phosphate rock.

12. A process of claim 1 wherein the pseudomorph comprises impurities previously associated with the phosphate rock.

13. A continuous process for producing storage stable, transportation stable, high purity, high quality phosphoric acid essentially free from impurities, which comprises the following steps:
   1) reacting aqueous hydrofluoric acid with phosphate in particles of calcium-bearing phosphate rock for a period of at least ten seconds and at a temperature of from ambient temperature to boiling to obtain an aqueous slurry containing filter-grade phosphoric acid and a solid component which is a pseudomorph comprised primarily of calcium fluoride,
   2) separating the filter-grade phosphoric acid from the calcium fluoride pseudomorph,
   3) regenerating the pseudomorph to obtain $CaSO_4$ and HF,
   4) recycling the HF obtained from regenerating the pseudomorph to step (1), and
   5) optionally concentrating the filter-grade phosphoric acid to a more highly concentrated acid.

14. A process of claim 13 wherein the calcium fluoride pseudomorph comprises impurities previously associated with the phosphate rock.

15. A calcium fluoride pseudomorph solid which is a phosphate/HF reaction product having the phosphate structure and comprising impurities previously associated with said phosphate.

* * * * *